United States Patent
Fukuma et al.

(10) Patent No.: US 8,415,060 B2
(45) Date of Patent: Apr. 9, 2013

(54) IN-VEHICLE FUEL CELL SYSTEM

(75) Inventors: Kazunori Fukuma, Saitama (JP); Kenji Nagumo, Saitama (JP); Takaharu Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 841 days.

(21) Appl. No.: 11/524,779

(22) Filed: Sep. 21, 2006

(65) Prior Publication Data

US 2007/0065696 A1  Mar. 22, 2007

(30) Foreign Application Priority Data

Sep. 21, 2005  (JP) .................................. 2005-274773
Sep. 21, 2005  (JP) .................................. 2005-274808
Sep. 21, 2005  (JP) .................................. 2005-274812

(51) Int. Cl.
*H01M 8/06* (2006.01)

(52) U.S. Cl.
USPC .......................................... 429/413; 429/408

(58) Field of Classification Search ..................... 429/34
See application file for complete search history.

(56) References Cited

U.S. PATENT DOCUMENTS

| | | | |
|---|---|---|---|
| 4,782,669 A * | 11/1988 | Trocciola et al. ............... | 62/434 |
| 6,479,180 B1 | 11/2002 | Uozumi | |
| 6,596,425 B2 | 7/2003 | Mirsch et al. | |
| 6,874,588 B2 * | 4/2005 | Kato et al. ....................... | 429/13 |
| 2002/0061426 A1 * | 5/2002 | Imaseki et al. .................. | 429/26 |
| 2004/0101725 A1 * | 5/2004 | Kato et al. ....................... | 429/24 |
| 2005/0112422 A1 | 5/2005 | Yoshimoto et al. | |
| 2007/0122669 A1 | 5/2007 | Kusano et al. | |

FOREIGN PATENT DOCUMENTS

| | | |
|---|---|---|
| JP | 2001-30771 | 2/2001 |
| JP | 2001-216983 | 8/2001 |
| JP | 2002-373691 | 12/2002 |
| JP | 2003-063257 | 3/2003 |
| JP | 2003-151605 | 5/2003 |
| JP | 2005-032685 | 2/2005 |
| JP | 2005-119600 | 5/2005 |
| JP | 2005-135707 | 5/2005 |
| WO | 2005/034272 A1 | 4/2005 |
| WO | WO 2005-034272 * | 4/2005 |

OTHER PUBLICATIONS

Japanese Office Action for Application No. 2005-274812, dated Dec. 21, 2010.
Japanese Office Action for Application No. 2005-274808, dated Sep. 7, 2010.
Japanese Office Action for Application No. 2005-274773, dated Feb. 9, 2010.

* cited by examiner

*Primary Examiner* — Ula C Ruddock
*Assistant Examiner* — Jacob Marks
(74) *Attorney, Agent, or Firm* — Nelson Mullins Riley & Scarborough LLP; Anthony A. Laurentano

(57) ABSTRACT

A fuel cell system mounted in a vehicle includes a fuel cell stack, a coolant supply mechanism, and a fuel gas supply mechanism. The coolant supply mechanism includes a coolant supply pipe and a coolant discharge pipe, provided on a front side in a traveling direction of the vehicle, relative to the fuel cell stack. The fuel gas supply mechanism includes a fuel gas supply pipe, provided on a rear side in the traveling direction, relative to the fuel cell stack.

6 Claims, 12 Drawing Sheets

⇨ OXYGEN-CONTAINING GAS
⇨ COOLANT
⇨ FUEL GAS

IN-VEHICLE FUEL CELL SYSTEM

BACKGROUND OF THE INVENTION

1. Field of the Invention

The present invention relates to an in-vehicle fuel cell system, including a fuel cell stack formed by stacking a plurality of power generation cells, and which is mounted in a vehicle.

2. Description of the Related Art

A polymer electrolyte fuel cell employs a membrane electrode assembly (electrolyte electrode assembly), which includes an anode, a cathode, and an electrolyte membrane interposed between the anode and the cathode. The electrolyte membrane forms a polymer ion exchange membrane. The membrane electrode assembly, together with separators sandwiching the membrane electrode assembly, make up a unit of a power generation cell (unit cell) for generating electricity. In use, generally, a predetermined number of unit cells are stacked together to form a fuel cell stack.

In general, a fuel cell stack of this type is mounted in a vehicle such as an automobile to make up a fuel cell vehicle (vehicle equipped with a fuel cell). In order to mount the fuel cell stack in the fuel cell vehicle, together with a coolant supply mechanism and a reactant gas supply mechanism connected to the fuel cell stack, various techniques have been adopted.

For example, Japanese Laid-Open Patent Publication No. 2003-63257 discloses a structure for mounting a fuel cell stack in a vehicle. As shown in FIG. 10, a fuel cell stack 1 is mounted in a vehicle 2. Coolant pipes 4, for supplying/discharging a coolant to/from the fuel cell stack 1, and gas pipes for supplying/discharging reactant gases to/from the fuel cell stack 1, are connected to an end plate 3 of the fuel cell stack 1, which is provided on the front side of the vehicle 2.

The gas pipes include fuel gas pipes 5 for supplying/discharging a fuel gas to/from the fuel cell stack 1, and oxygen-containing gas pipes 6 for supplying/discharging an oxygen-containing gas to/from the fuel cell stack 1.

The coolant pipes 4, the fuel gas pipes 5, and the oxygen-containing gas pipes 6 are provided on the front side of the vehicle 2 relative to the fuel cell stack 1, and the coolant pipes 4, the fuel gas pipes 5, and the oxygen-containing gas pipes 6 are connected to a compressor 7. A radiator fan 8 is provided on the front side of the vehicle 2. The radiator fan 8 supplies a cooling wind to heated regions of the coolant pipes 4, the fuel gas pipes 5, and the oxygen-containing gas pipes 6, which are heated by the compressor 7.

In Japanese Laid-Open Patent Publication 2003-63257, the coolant pipes 4, the fuel gas pipes 5, and the oxygen-containing gas pipes 6 are connected to the end plate 3, wherein all of the coolant pipes 4, the fuel gas pipes 5, and the oxygen-containing gas pipes 6 are provided on the front side of the vehicle 2. Thus, the piping structure is complicated and the space required for providing such pipes is large.

Further, in addition to various auxiliary devices, for example, a humidifier for humidifying the reactant gases is provided on the front side of the vehicle 2. Thus, the piping structure becomes even more complicated, and the length of the pipes is large. As a result, pressure losses occur, and further, the weight of the pipes is disadvantageously heavy.

Further, Japanese Laid-Open Patent Publication No. 2001-30771 discloses a fuel cell supporting apparatus 1a for a vehicle. As shown in FIG. 11, the supporting apparatus 1a includes a fuel cell 2a, with support members 3a that support the fuel cell 2a. The fuel cell 2a is formed by alternately stacking unit cells 4a and separators 5a. Plates 6a and 7a are provided at opposite ends of the fuel cell 2a in the stacking direction, wherein the stacking direction of the fuel cell 2a matches the longitudinal direction of the vehicle.

The support members 3a include a first support member 8a, for supporting the plate 6a on a front side thereof, and a second support member 9a, for supporting the plate 7a on the rear side thereof.

The first support member 8a supports the fuel cell 2a with respect to a force that acts to move the fuel cell 2a forward relative to the vehicle, e.g., in the event of sudden braking during traveling, or in the event of a head-on collision. The first support member 8a supports the fuel cell 2a such that the fuel cell 2a cannot move toward the front side of the vehicle.

The second support member 9a supports the fuel cell 2a, such that the fuel cell 2a is movable toward the rear side of the vehicle, in the event of sudden start or sudden acceleration of the vehicle, wherein the fuel cell 2a is movable in any of forward, backward, upward, and downward directions.

In the fuel cell 2a, in addition to various auxiliary devices, for example, a humidifier for humidifying reactant gases is used. Thus, dedicated support members for supporting devices such as the humidifier are required, in addition to the support members for supporting the fuel cell 2a. Consequently, in the conventional technique, since dedicated support members are required for respective devices, the number of components is considerably large, the space required for providing such devices is large, and the overall weight of the equipment is heavy.

Further, in a fuel cell system disclosed in U.S. Pat. No. 6,596,425, as shown in FIG. 12, an air filter 2b and a compressor 3b are provided in a channel 1b that supplies air (oxygen-containing gas) to a fuel cell (not shown).

A water remover 5b is provided in an off gas channel 4b, which serves as a passage for off gases discharged from the cathode of the fuel cell (not shown). The water remover 5b removes water contained in the off gas that is discharged from the cathode, and supplies the water to a medium channel 6b. The water supplied to the medium channel 6b is mixed with air flowing through the channel 1b in order to humidify the air.

According to the disclosure, the medium channel 6b includes a heat channel section 7b. Electricity is supplied to the heat channel section 7b from a vehicle battery, or from the fuel cell, in order to heat the heat channel section 7b. Thus, the water supplied from the medium channel 6b into the channel 1b is maintained in a liquid state, and freezing of the water is prevented.

In U.S. Pat. No. 6,596,425, the heat channel section 7b is provided in the medium channel 6b, and electricity needs to be supplied to the heat channel section 7b from the battery or from the fuel cell. Thus, uneconomically, excessive electricity is consumed. Further, the number of components is large, the structure is complicated, and the cost for such equipment is large.

SUMMARY OF THE INVENTION

A main object of the present invention is to provide an in-vehicle fuel cell system, which makes it possible to simplify the piping structure, reduce the pipe length and weight, and to easily reduce pressure losses.

Further, another object of the present invention is to provide an in-vehicle fuel cell system, which makes it possible to easily reduce the number of components, by using components having multiple functions, thereby easily reducing the weight of the fuel cell system.

Further, still another object of the present invention is to provide an in-vehicle fuel cell system, in which the heat of a humidifier can be effectively utilized in order to suitably maintain the temperature of reactant gas auxiliary devices, with a simple and economical structure.

According to the present invention, an in-vehicle fuel cell system comprises a fuel cell stack, a coolant supply mechanism, and a reactant gas supply mechanism. The fuel cell stack is formed by stacking a plurality of power generation cells, and the fuel cell stack is mounted in a vehicle. The coolant supply mechanism supplies a coolant to the fuel cell stack. The reactant gas supply mechanism supplies a reactant gas to the fuel cell stack.

The coolant supply mechanism includes a coolant pipe, provided on a front side in a traveling direction of the vehicle, relative to the fuel cell stack, and the reactant gas supply mechanism includes a reactant gas pipe, provided on a rear side in the traveling direction of the vehicle, relative to the fuel cell stack.

Preferably, the fuel cell stack is provided at a center position in a lateral direction of the vehicle, and the power generation cells are stacked in a longitudinal direction of the vehicle.

Further, preferably, the power generation cell includes an electrolyte electrode assembly and a separator, the electrolyte electrode assembly including a pair of electrodes and an electrolyte interposed between the electrodes, and the power generation cell has a rectangular shape, with long sides thereof extending in a vertical direction.

Preferably, the reactant gas supply mechanism comprises a fuel gas supply mechanism for supplying a fuel gas, and the fuel gas supply mechanism includes a fuel tank, provided on the rear side in the traveling direction of the vehicle, relative to the fuel cell stack, and a fuel gas pipe as a reactant gas pipe connecting the fuel cell stack and the fuel tank.

Further, preferably, the in-vehicle fuel cell system further comprises a hollow fiber type humidifier coupled at a position on the rear side in the traveling direction of the vehicle, relative to the fuel cell stack, and the hollow fiber type humidifier includes a hollow fiber extending in a longitudinal direction of the vehicle.

Further, according to the present invention, the humidifier includes a coupling section fixed to one end of the fuel cell stack in the stacking direction, and a mount section fixed to a mount section of the vehicle while supporting the one end of the fuel cell stack in the stacking direction.

Further, according to the present invention, the humidifier includes a metal cover member, wherein a reactant gas auxiliary device is directly attached to the metal cover member.

In the present invention, the coolant supply mechanism includes the coolant pipe, provided on the front side in the traveling direction of the vehicle, relative to the fuel cell stack. Therefore, for example, the pipes extending from the radiator (heat exchanger), and which are provided on the front side of the vehicle for supplying/discharging the coolant to/from the fuel cell stack, are short. In this structure, it is possible to effectively reduce pressure losses in the pipes, and further, a reduction in the pipe weight is advantageously achieved.

Further, the reactant gas supply mechanism includes reactant gas pipes, provided on the rear side in the traveling direction of the vehicle, relative to the fuel cell stack. Therefore, for example, the pipes extending from the fuel tank, and which are provided on the rear side of the vehicle for supplying the fuel gas to the fuel cell stack, are short. In this structure, the fuel gas is supplied efficiently to the fuel cell. Further, the coolant pipes are provided on the front side of the fuel cell stack, while the reactant gas pipes are provided on the rear side of the fuel cell stack. Therefore, the piping structure is simple, whereby pressure losses in the pipes can be effectively reduced, and a reduction in the weight of the pipes can be advantageously achieved.

Further, in the present invention, the coupling section of the humidifier is fixed to one end of the fuel cell stack in the stacking direction, and the mount section of the humidifier is fixed to the mount section of the vehicle, while supporting the one end of the fuel cell stack in the stacking direction. Thus, the mount section of the humidifier provides mounting functions for fixing the humidifier to the mount section of the vehicle, as well as for fixing the one end of the fuel cell stack to the mount section of the vehicle in the stacking direction.

In this structure, as a result of the multiple functions of the mount section, and without requiring any dedicated mount structure, the number of components is advantageously reduced at the one end of the fuel cell stack in the stacking direction, and thus, the overall weight of the in-vehicle fuel cell system can be easily reduced.

Further, in the present invention, the reactant gas auxiliary devices are directly attached to the metal cover member of the humidifier. Thus, owing to the fact that compressed hot reactant gas (air) is supplied to the humidifier, and accordingly the humidifier is maintained at a high temperature, the heat of the humidifier also maintains the temperature of the reactant gas auxiliary devices.

Thus, a dedicated mechanism for maintaining the temperature of the reactant gas auxiliary devices is not required. With a simple and economical structure, the temperature of the reactant gas auxiliary devices is suitably maintained. In particular, when used in cold regions, it is possible to reliably prevent freezing of the reactant gas auxiliary devices.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
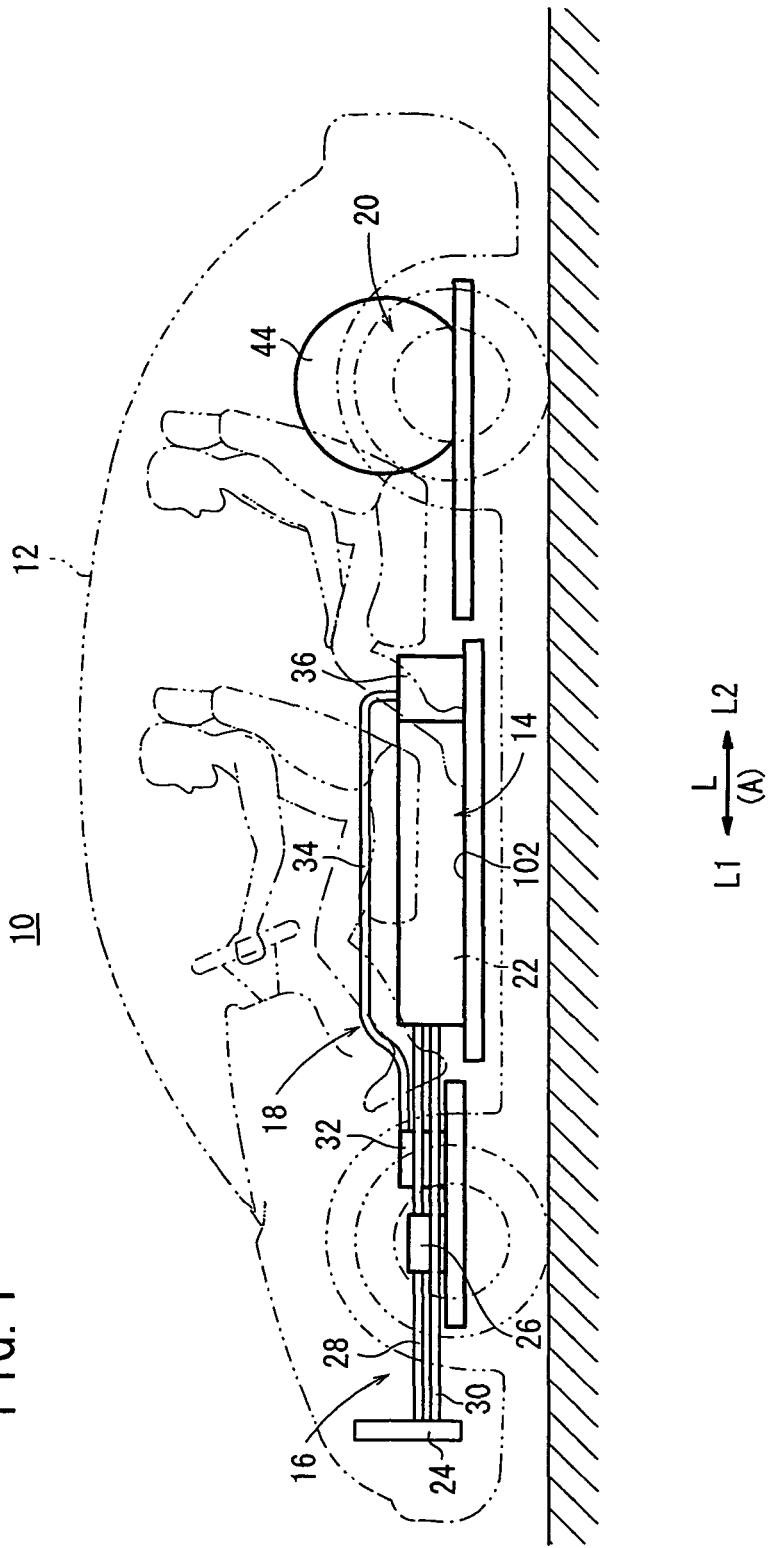
FIG. 1 is a side view schematically showing a vehicle equipped with an in-vehicle fuel cell system according to an embodiment of the present invention.
Figure 2:
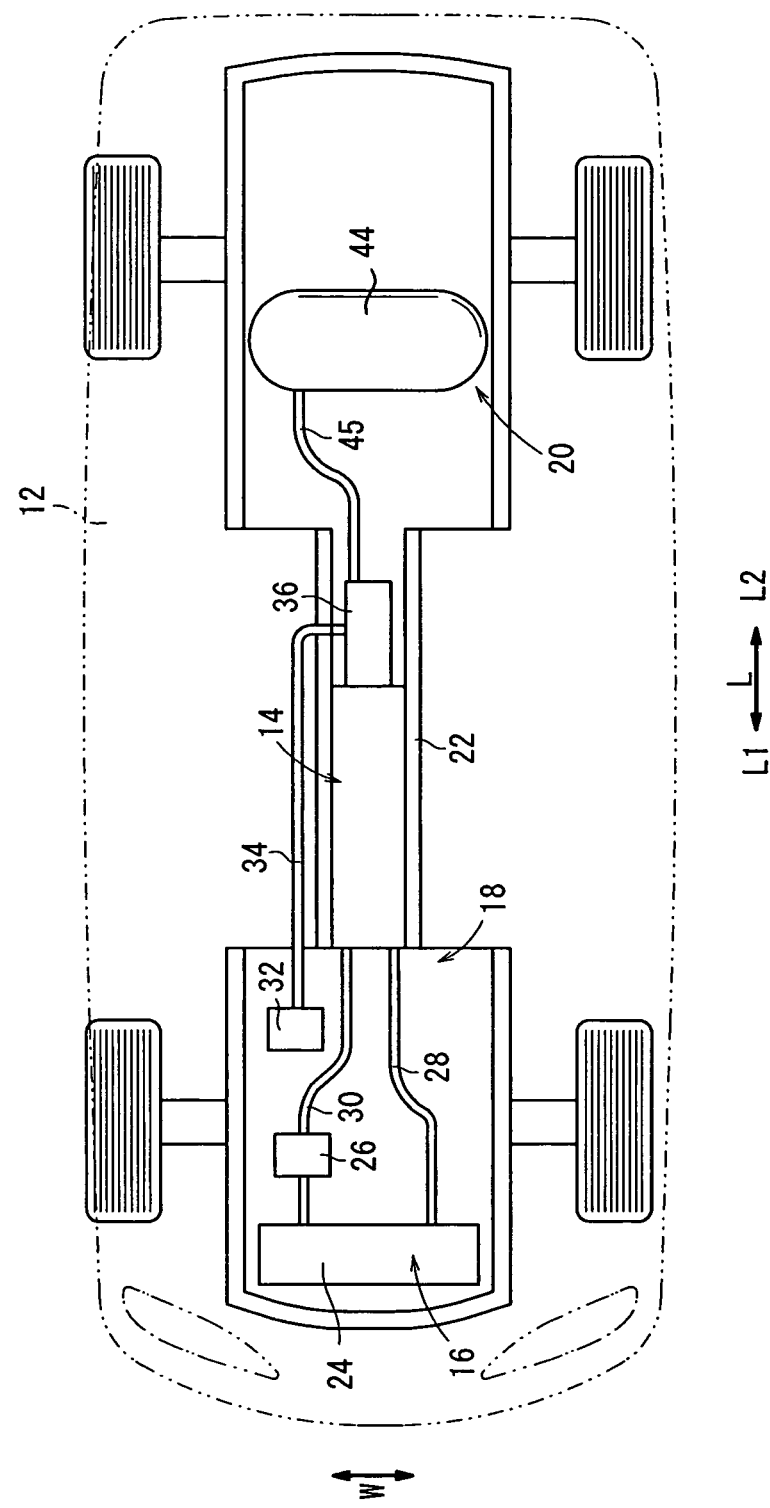
FIG. 2 is a partial plan view of the vehicle, principally showing the fuel cell system.
Figure 3:
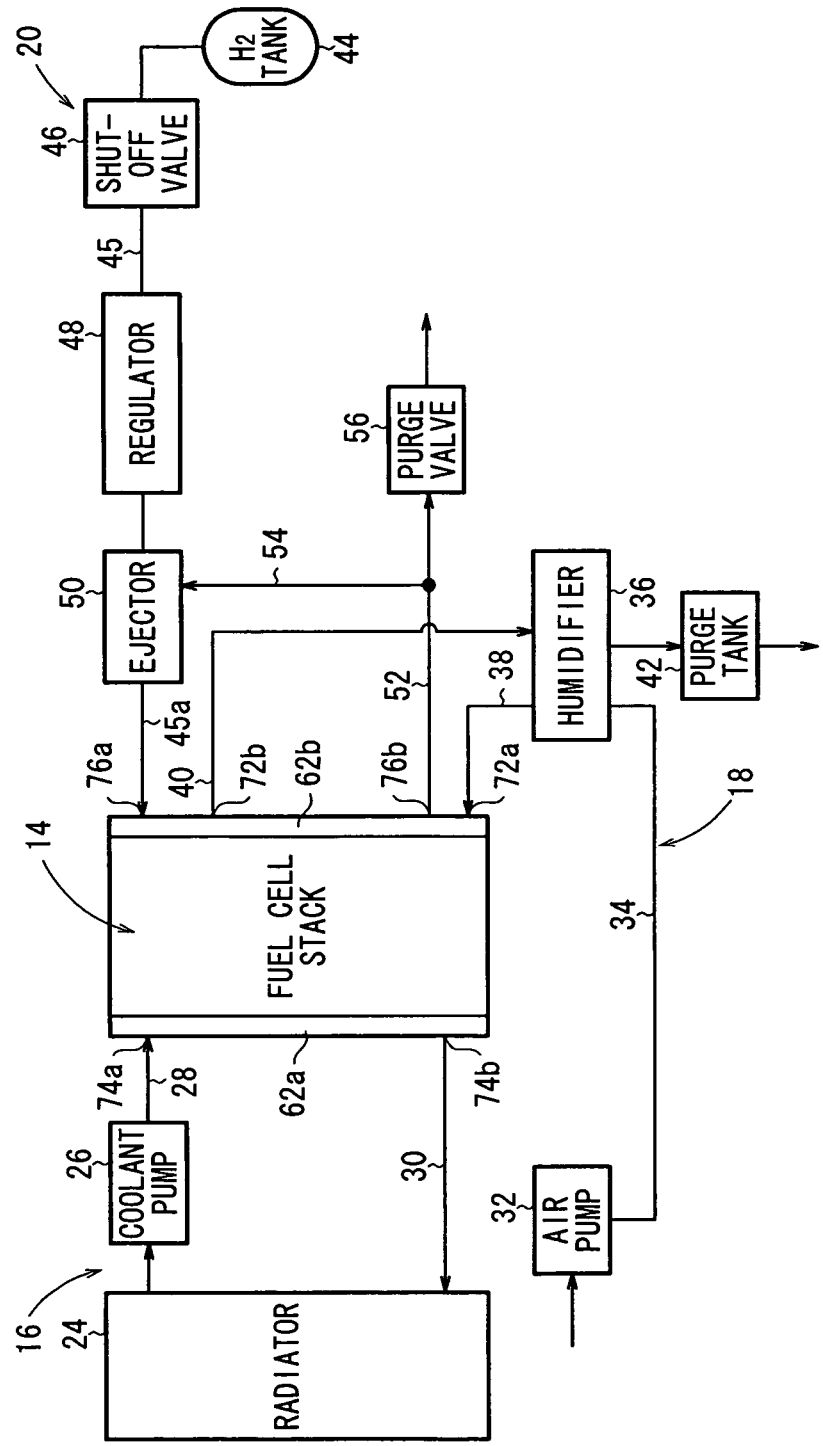
FIG. 3 is a diagram schematically showing the structure of the fuel cell system.

FIG. 1 is a side view schematically showing a vehicle 12, which is equipped with an in-vehicle fuel cell system 10 according to an embodiment of the present invention. FIG. 2 is a partial plan view of the vehicle 12, principally showing the fuel cell system 10. FIG. 3 is a diagram schematically showing the structure of the fuel cell system 10.

In FIG. 3, for purposes of illustration, components, to be described in detail later, are shown at positions different from their actual positions. The actual positions of the components are as shown in FIGS. 1 and 2.

The fuel cell system 10 includes a fuel cell stack 14, a coolant supply mechanism 16 for supplying a coolant to the fuel cell stack 14, an oxygen-containing gas supply mechanism (reactant gas supply mechanism) 18 for supplying an oxygen-containing gas to the fuel cell stack 14, and a fuel gas supply mechanism (reactant gas supply mechanism) 20 for supplying a fuel gas to the fuel cell stack 14.

The fuel cell stack 14 is provided at a center position in the lateral direction of the vehicle 12, as indicated by the arrow W in FIG. 2. The stacking direction of the fuel cell stack 14, as described later, matches the longitudinal direction of the vehicle 12, as indicated by the arrow A. For example, the fuel cell stack 14 is provided in a center console 22.

As shown in FIGS. 1 to 3, the coolant supply mechanism 16 includes a radiator 24, which is provided on the front side in the traveling direction of the vehicle 12, as indicated by the arrow L1. A coolant supply pipe 28 and a coolant discharge pipe 30 are connected to the radiator 24 through a coolant pump 26. The coolant supply pipe 28 and the coolant discharge pipe 30 are also provided on the front side in the traveling direction of the vehicle 12, relative to the fuel cell stack 14.

The oxygen-containing gas supply mechanism 18 includes an air pump 32 disposed near the coolant pump 26. One end of an air supply pipe 34 is connected to the air pump 32, and the other end of the air supply pipe 34 is connected to a humidifier 36. The fuel cell stack 14 is connected to the humidifier 36 through a humidified air supply pipe 38. An off gas supply pipe 40, which supplies consumed oxygen-containing gas (hereinafter referred to as "off gas") acting as a humidified fluid, is connected to the fuel cell stack 14 and the humidifier 36. A back pressure valve 42 is provided on a side where the off gas, supplied through the off gas supply pipe 40, is discharged (see FIG. 3).

The fuel gas supply mechanism 20 includes a fuel gas tank (fuel tank) 44 for storing hydrogen gas as a fuel gas. One end of a fuel gas supply pipe 45 is connected to the fuel gas tank 44, and the other end of the fuel gas supply pipe 45 is connected to the fuel cell stack 14 through a shut-off valve 46, a regulator 48, and an ejector 50.

An exhaust fuel gas pipe 52, for discharging the consumed fuel gas, is connected to the fuel cell stack 14. The exhaust fuel gas pipe 52 is connected to the ejector 50 through a return pipe 54, and is partially connected to a purge valve 56.

Figure 4:
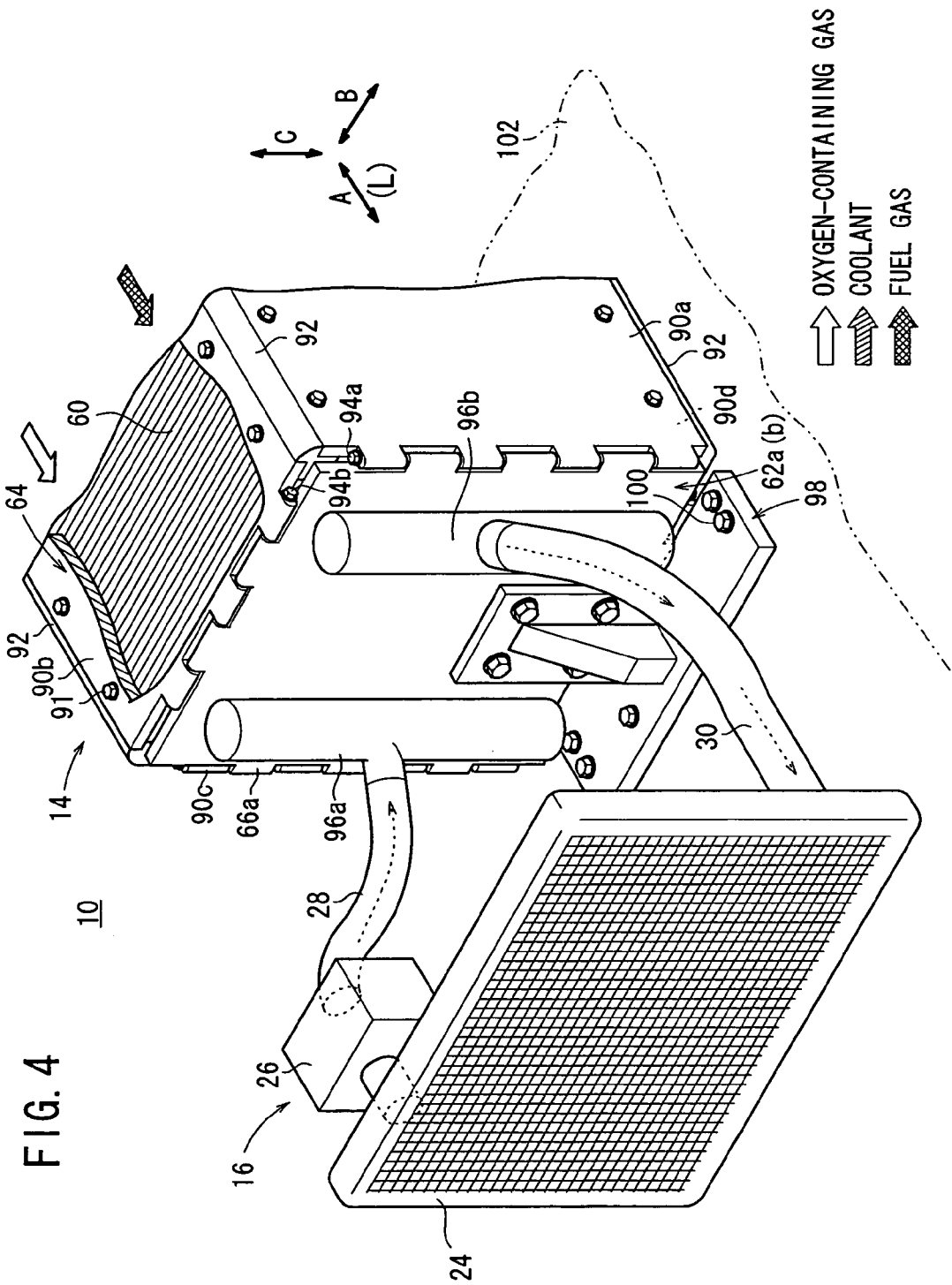
FIG. 4 is a perspective view schematically showing main components of a coolant supply mechanism and a fuel cell stack of the fuel cell system.

As shown in FIG. 4, the fuel cell stack 14 is formed by stacking a plurality of power generation cells 60 in a horizontal direction, i.e., in the longitudinal direction of the vehicle 12 as indicated by the arrow A. Although not shown, terminal plates and insulating plates are provided at opposite ends in the stacking direction, and metal end plates 62a, 62b are provided outside of the terminal plates and the insulating plates. The fuel cell stack 14 has a casing 64, wherein the casing 64 includes the rectangular end plates 62a, 62b having long sides thereof oriented in a vertical direction, as indicated by the arrow C.

Figure 5:
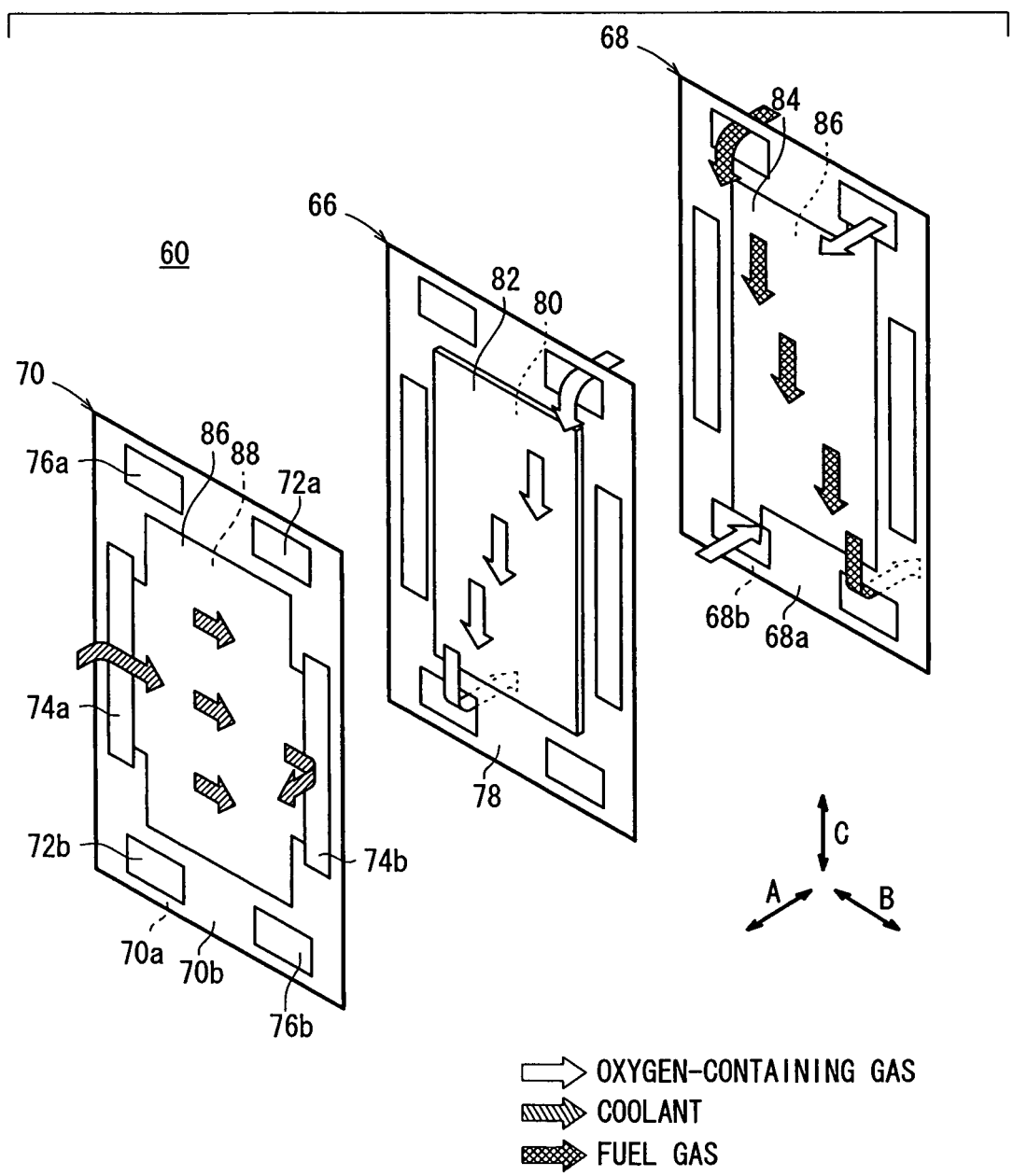
FIG. 5 is an exploded perspective view showing a power generation cell of the fuel cell stack.

As shown in FIG. 5, each of the power generation cells 60 includes a membrane electrode assembly (electrolyte electrode assembly) 66, and first and second metal separators 68, 70 sandwiching the membrane electrode assembly 66. The first and second metal separators 68, 70 are thin elongated corrugated plates. Instead of the first and second metal separators 68, 70, carbon separators may also be used.

At one end of the power generation cell 60, in a lateral direction as indicated by the arrow B, an oxygen-containing gas supply passage 72a for supplying an oxygen-containing gas, a coolant discharge passage 74b for discharging a coolant, and a fuel gas discharge passage 76b for discharging a fuel gas such as a hydrogen-containing gas, are provided respectively. The oxygen-containing gas supply passage 72a, the coolant discharge passage 74b, and the fuel gas discharge passage 76b extend through the power generation cell 60 in the direction indicated by the arrow A.

At the other end of the power generation cell 60 in the lateral direction, a fuel gas supply passage 76a for supplying the fuel gas, a coolant supply passage 74a for supplying the coolant, and an oxygen-containing gas discharge passage 72b for discharging the oxygen-containing gas, are provided respectively. The fuel gas supply passage 76a, the coolant supply passage 74a, and the oxygen-containing gas discharge passage 72b extend through the power generation cell 60 in the direction indicated by the arrow A.

The membrane electrode assembly 66 includes an anode 80, a cathode 82, and a solid polymer electrolyte membrane 78 interposed between the anode 80 and the cathode 82. The solid polymer electrolyte membrane 78 may be formed by impregnating a thin membrane of perfluorosulfonic acid with water, for example.

The first metal separator 68 defines a fuel gas flow field 84 on a surface 68a thereof facing the membrane electrode assembly 66. The fuel gas flow field 84 is connected between the fuel gas supply passage 76a and the fuel gas discharge passage 76b. For example, the fuel gas flow field 84 comprises grooves extending in the direction indicated by the arrow C. A coolant flow field 86 is formed on a surface 68b of the first metal separator 68. The coolant flow field 86 is connected between the coolant supply passage 74a and the coolant discharge passage 74b. The coolant flow field 86 comprises grooves extending in the direction indicated by the arrow B.

The second metal separator 70 has an oxygen-containing gas flow field 88 on a surface 70a thereof facing the membrane electrode assembly 66. The oxygen-containing gas flow field 88 is connected between the oxygen-containing gas supply passage 72a and the oxygen-containing gas discharge passage 72b. For example, the oxygen-containing gas flow field 88 comprises grooves extending in the direction indicated by the arrow C. The coolant flow field 86 is formed on a surface 70b of the second metal separator 70. When the surface 68b of the first metal separator 68 and the surface 70b of the second metal separator 70 are stacked together, the coolant flow field 86 is defined between the surface 68b of the first metal separator 68 and the surface 70b of the second metal separator 70. Although not shown, seal members are formed on the first and second metal separators 68, 70 as necessary.

As shown in FIG. 4, the casing 64 includes the end plates 62a, 62b, four panel members 90a to 90d provided on the sides of the stacked power generation cells 60, angle members 92 connecting adjacent ends of the panel members 90a to 90d by bolts 91, and coupling pins 94a, 94b having different lengths for connecting the end plates 62a, 62b and the panel members 90a to 90d to each other. The panel members 90a to 90d are thin metal plates.

A coolant inlet manifold 96a and a coolant outlet manifold 96b, which extend in the direction indicated by the arrow C, are connected to the end plate 62a. The coolant inlet manifold 96a is connected to the coolant supply passage 74a, and the coolant outlet manifold 96b is connected to the coolant discharge passage 74b. Further, the coolant inlet manifold 96a and the coolant outlet manifold 96b are connected respectively to the radiator 24 through the coolant supply pipe 28 and the coolant discharge pipe 30.

A mounting bracket 98 is fixed to a lower portion of the end plate 62a by screws. The mounting bracket 98 is fixed to an installation section (mount section) 102 of the vehicle 12 using bolts 100.

Figure 6:
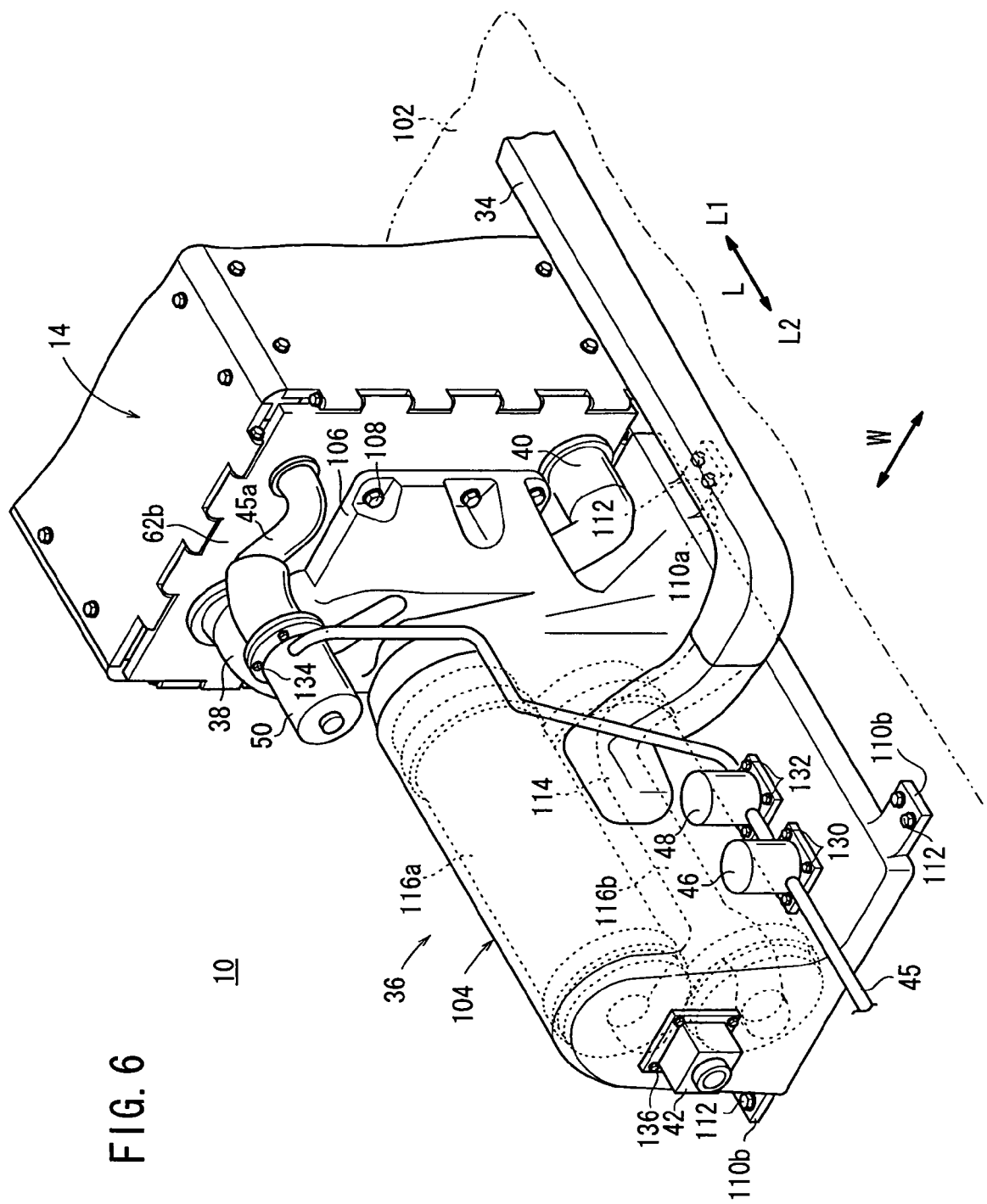
FIG. 6 is a perspective view schematically showing a humidifier along with the fuel cell stack of the fuel cell system.
Figure 7:
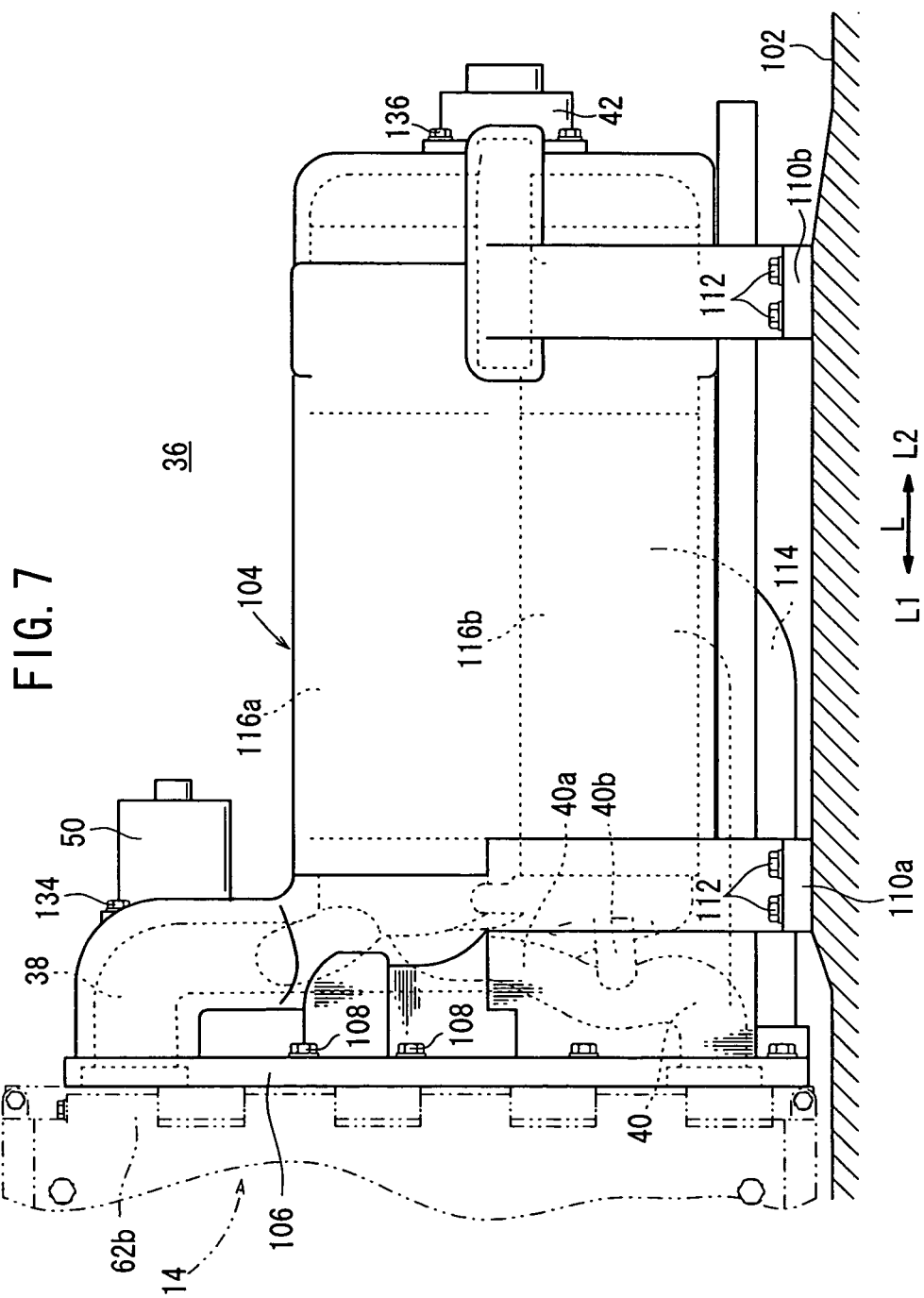
FIG. 7 is a side view showing the humidifier and the fuel cell stack.

As shown in FIGS. 6 and 7, a metal casing (cover member) 104, forming part of the humidifier 36, is fixed to the end plate 62b of the fuel cell stack 14. A casing 104 is provided, which is formed, for example, by molding, and a plurality of bolts 108 are inserted into a flange section (coupling section) 106, which contacts the end plate 62b. The bolts 108 are screwed into the end plate 62b in order to fix the casing 104 to the end plate 62b.

At both ends of the casing 104, in a direction indicated by the arrow L, mount sections 110a, 110b are provided on both left and right sides, extending in the direction indicated by the arrow W. A predetermined number of bolts 112 are inserted into the mount sections 110a, 110b, respectively. The bolts 112 are screwed into the installation section 102 in order to fix the casing 104 to the installation section 102.

Figure 8:
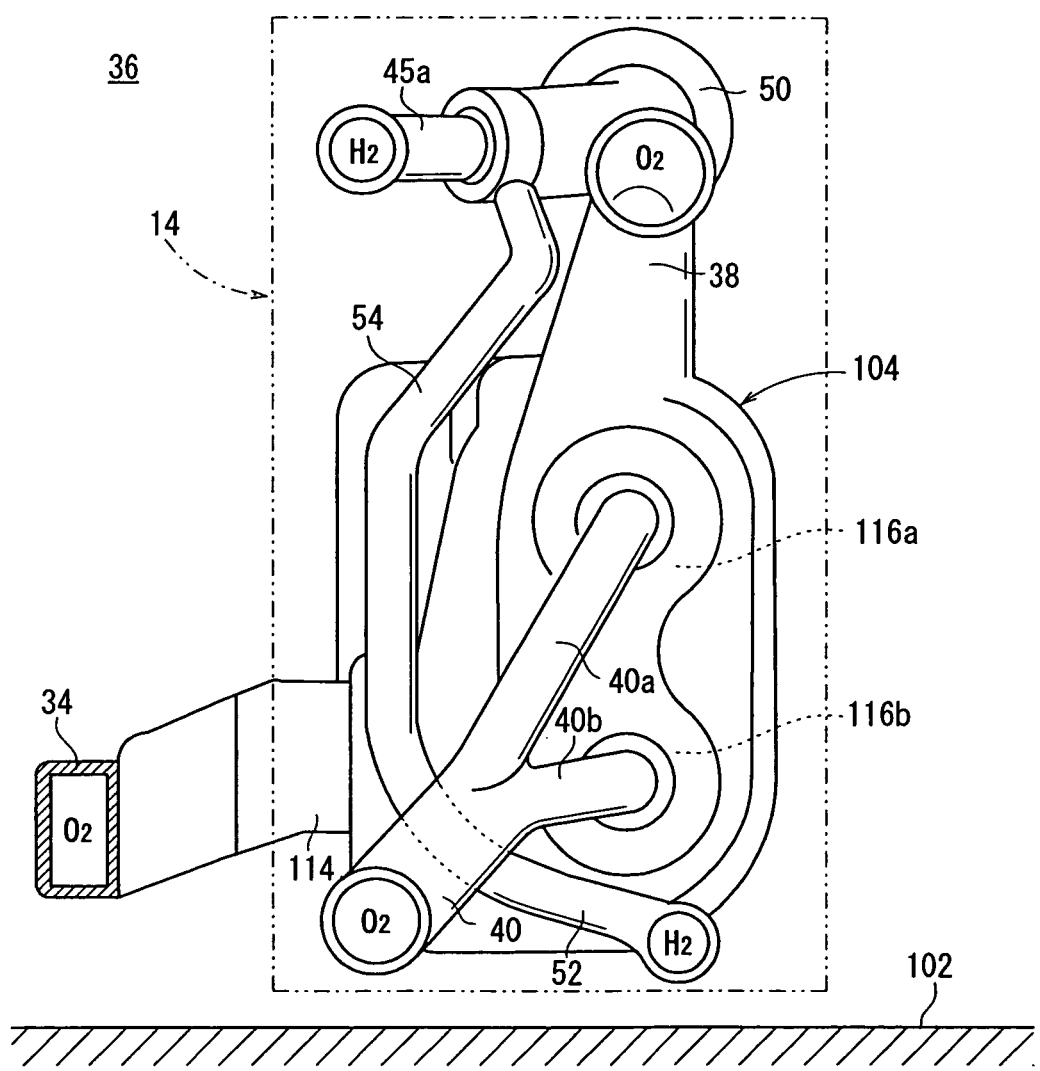
FIG. 8 is a front view showing the humidifier as viewed from a side where the humidifier is attached.
Figure 9:
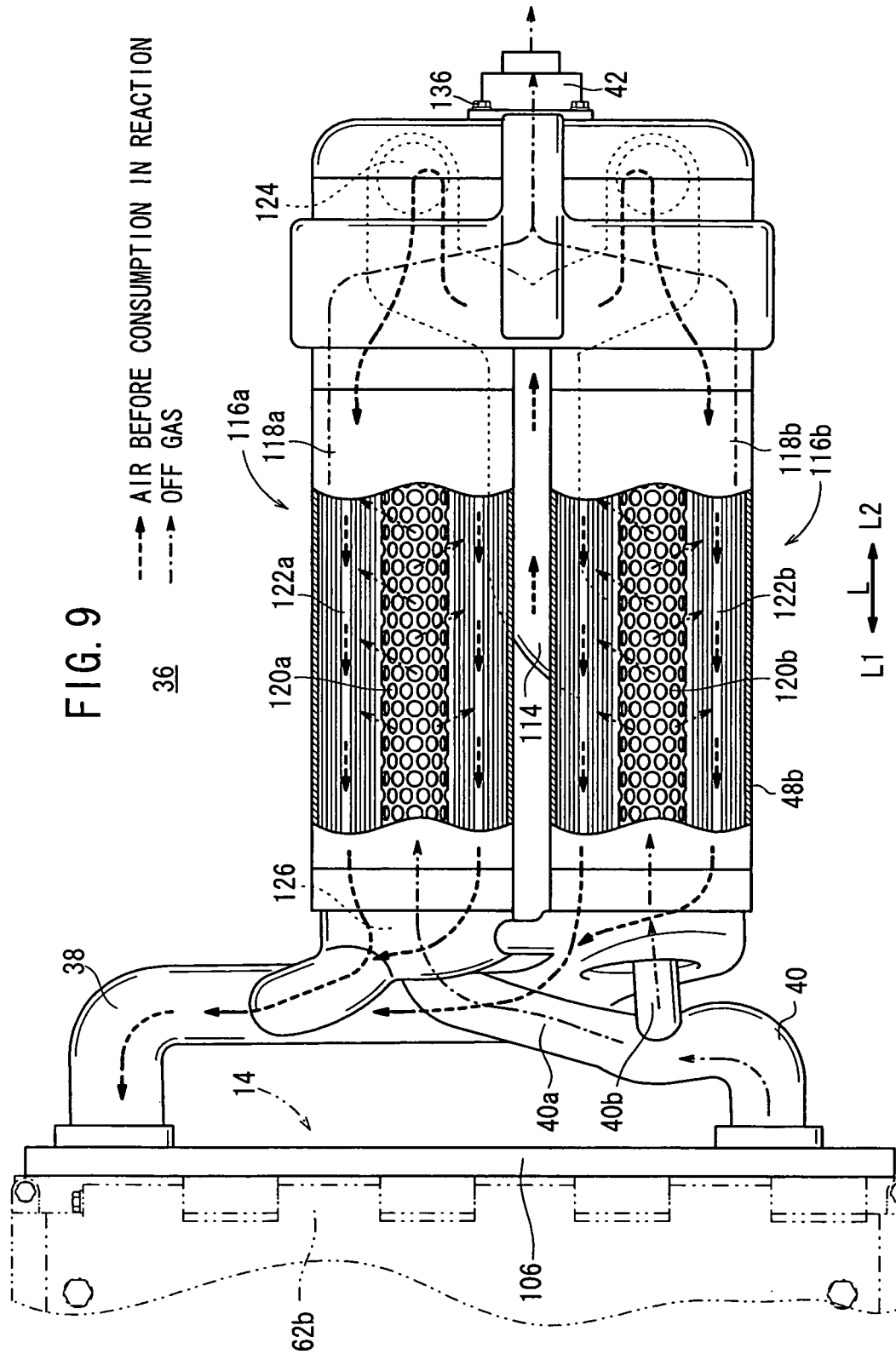
FIG. 9 is a partial cutaway view showing the interior of the humidifier.
Figure 10:
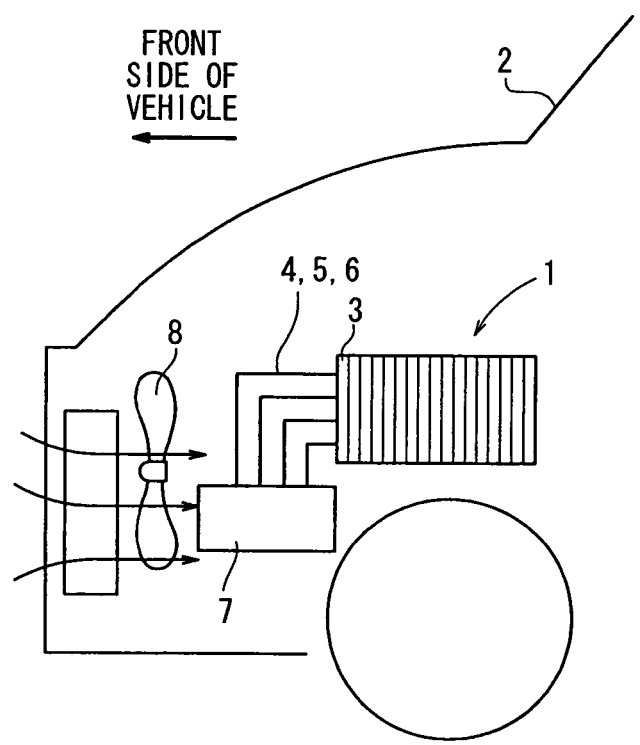
FIG. 10 is a view showing a structure for mounting a fuel cell stack in a vehicle, as disclosed in Japanese Laid-Open Patent Publication No. 2003-63257.
Figure 11:
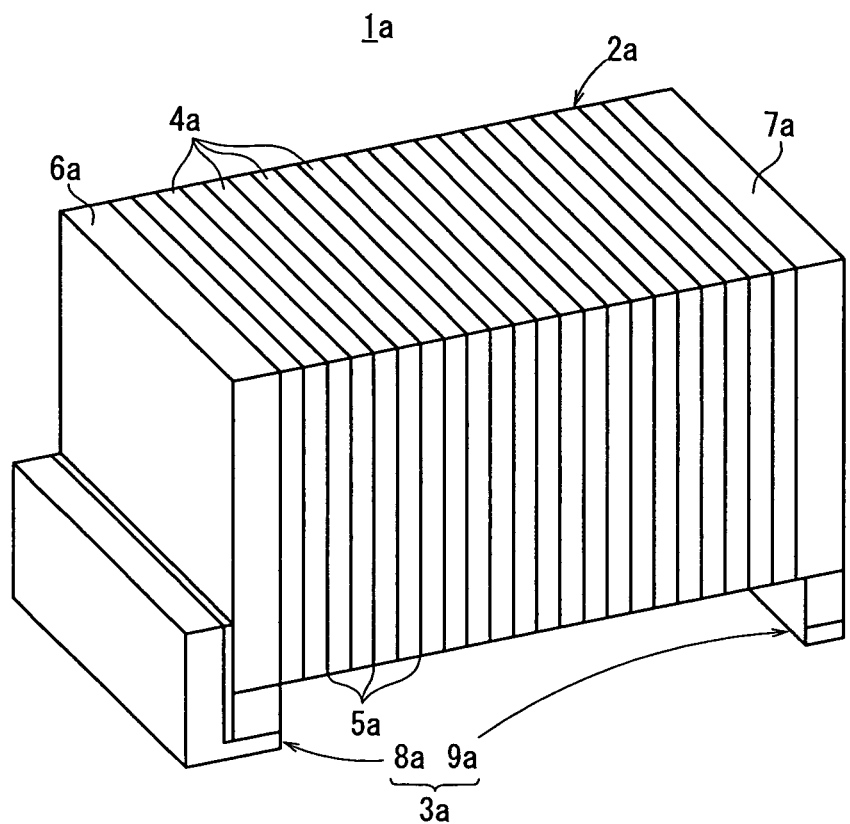
FIG. 11 is a view showing a fuel cell supporting apparatus for a vehicle, as disclosed in Japanese Laid-Open Patent Publication No. 2001-30771.
Figure 12:
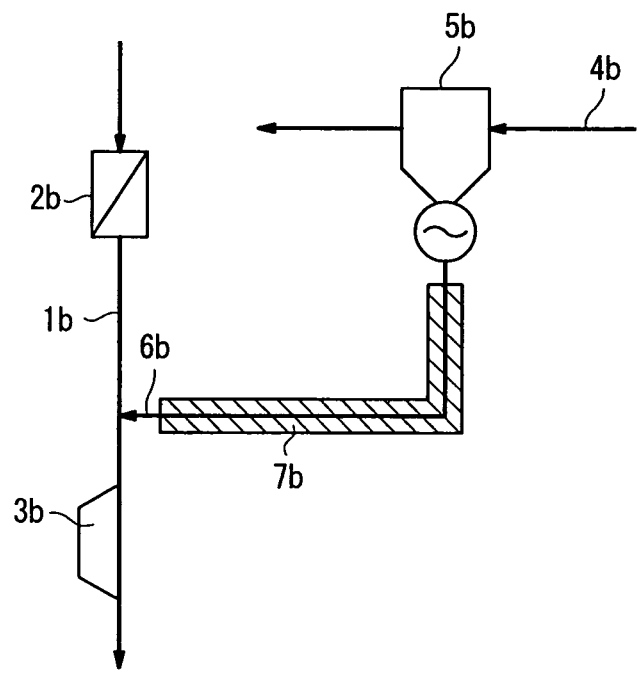
FIG. 12 is a diagram showing the fuel cell system disclosed in U.S. Pat. No. 6,596,425.

As shown in FIGS. 8 and 9, an air channel pipe 114 connected to the air supply pipe 34 is provided inside the casing 104. The air channel pipe 114 is connected to one end of first and second vertically arranged humidification sections 116a and 116b. At the other end of the first and second humidification sections 116a, 116b, opposite to the one end thereof where the air channel pipe 114 is connected, branch pipes 40a, 40b are provided, which branch from the off gas supply pipe 40 and connect to the humidified air supply pipe 38.

The return pipe 54, connecting the exhaust fuel gas pipe 52 and the fuel gas supply pipe 45, is provided (see FIG. 8) in the casing 104. The air channel pipe 114, the branch pipes 40a, 40b, the humidified air supply pipe 38, the exhaust fuel gas pipe 52, and the return pipe 54, serving as reactant gas pipes, are formed integrally with the casing 104, e.g., by molding.

As shown in FIG. 9, the first and second humidification sections 116a, 116b include cylindrical bodies 118a, 118b, respectively. Porous tubes 120a, 120b, having a large number of apertures, are formed substantially at the centers of the cylindrical bodies 118a, 118b, and a plurality of hollow fiber membranes 122a, 122b, extending in the longitudinal direction of the vehicle 12 as indicated by the arrow L, are provided so as to surround the porous tubes 120a, 120b, respectively. The off gas is supplied into the porous tubes 120a 120b, which are connected respectively to the branch pipes 40a, 40b.

The air, prior to consumption in the power generation reaction, is supplied into the hollow fiber membranes 122a, 122b through chambers 124 connected to the air channel pipe 114. Outlets of the hollow fiber membranes 122a, 122b are connected to the humidified air supply pipe 38 through chambers 126.

Auxiliary devices for a fuel gas that serves as a reactant gas (hereinafter referred to as "reactant gas auxiliary devices"), and which make up part of the fuel gas supply mechanism 20, are directly attached to the casing 104. As shown in FIG. 6, the shut-off valve 46 is fixed to the casing 104 using bolts 130, and the regulator 48 is fixed to the casing 104 through bolts 132 screwed into the casing 104 at a position near the shut-off valve 46.

The ejector 50 is fixed to a fuel gas inlet pipe 45a, which forms part of the fuel gas supply pipe 45, on a downstream side thereof by means of bolts 134 screwed into the fuel gas inlet pipe 45a. The back pressure valve 42, which is an auxiliary device for an oxygen-containing gas that acts as a reactant gas (reactant gas auxiliary device) as part of the oxygen-containing gas supply mechanism 18, is fixed to an end of the casing 104 by screwing bolts 136 into the casing 104. Further, various other auxiliary devices may be fixed to the casing 104 by screws or the like.

In the present embodiment, with reference to FIG. 3, branch pipes may be provided through a purge valve (not shown) between the air supply pipe 34 of the oxygen-containing gas supply mechanism 18 and the downstream side of the ejector 50 of the fuel gas supply mechanism 20, such that the fuel gas remaining in the fuel gas channel of the fuel cell stack 14 can be purged (discharged) using air.

Next, operations of the fuel cell system 10 shall be described below.

First, referring to FIG. 3, the air pump 32 of the oxygen-containing gas supply mechanism 18 is operated in order to suck outside air, which serves as the oxygen-containing gas. Thus, the oxygen-containing gas is supplied into the air supply pipe 34. The air flows from the air supply pipe 34 into the humidifier 36 through the air channel pipe 114.

Inside the humidifier 36, as shown in FIG. 9, air is supplied from the chambers 124 into the first and second humidification sections 116a, 116b. The air flows through the hollow fiber membranes 122a, 122b in the first and second humidification sections 116a, 116b. After the air has moved toward one side of the cylindrical bodies 118a, 118b, in the direction indicated by the arrow L1, the air is supplied to the humidified air supply pipe 38.

At this time, as described later, the off gas (the oxygen-containing gas that has been consumed during the reaction) is supplied from the off gas supply pipe 40 into the branch pipes 40a, 40b. The off gas moves from the inside to the outside of the porous tubes 120a, 120b of the first and second humidification sections 116a, 116b, and flows outside the hollow fiber membranes 122a, 122b. Then, the off gas moves toward the other side of the cylindrical bodies 118a, 118b, in the direction indicated by the arrow L2, and is discharged to the outside from the back pressure valve 42.

In this structure, water in the off gas moves through the hollow fiber membranes 122a, 122b in the air before consumption. Therefore, the air is humidified before being consumed. The humidified air flows from the humidified air supply pipe 38 into the oxygen-containing gas supply passage 72a in the fuel cell stack 14 through the end plate 62b.

In the fuel gas supply mechanism 20 shown in FIG. 3, when the shut-off valve 46 is opened, the pressure of the fuel gas (hydrogen gas) in the fuel gas tank 44 is reduced at the regulator 48. Then, the fuel gas flows through the ejector 50, and flows from the fuel gas supply pipe 45 into the fuel gas supply passage 76a in the fuel cell stack 14 through the end plate 62b.

Further, in the coolant supply mechanism 16, by operation of the coolant pump 26, a coolant is supplied from the coolant supply pipe 28 into the coolant supply passage 74a in the fuel cell stack 14 through the end plate 62a.

As shown in FIG. 5, the air supplied to the power generation cell 60 in the fuel cell stack 14 flows from the oxygen-containing gas supply passage 72a into the oxygen-containing gas flow field 88 of the second metal separator 70. Then, the oxygen-containing gas flows along the cathode 82 of the membrane electrode assembly 66, for inducing an electrochemical reaction at the cathode 82. The fuel gas flows from the fuel gas supply passage 76a into the fuel gas flow field 84 of the first metal separator 68, and then flows along the anode 80 of the membrane electrode assembly 66, for inducing an electrochemical reaction at the anode 80.

Thus, in each of the membrane electrode assemblies 66, oxygen in the air supplied to the cathode 82, and the fuel gas (hydrogen) supplied to the anode 80, are consumed in electrochemical reactions occurring at catalyst layers of the cathode 82 and the anode 80, thereby generating electricity.

Then, the air consumed at the cathode 82 flows along the oxygen-containing gas discharge passage 72b, and then, the air is discharged as the off gas from the end plate 62b, while flowing into the off gas supply pipe 40 (see FIG. 3).

Likewise, the fuel gas consumed at the anode 80 flows along the fuel gas discharge passage 76b, and then, the fuel gas is discharged as the exhaust fuel gas from the end plate 62b, while flowing into the exhaust gas fuel pipe 52. A portion of the exhaust fuel gas discharged to the exhaust fuel gas pipe 52 flows through the return pipe 54, and by a sucking operation of the ejector 50, the exhaust fuel gas returns to the fuel gas supply pipe 45. The exhaust fuel gas is mixed with the fresh fuel gas, and then is supplied from the fuel gas inlet pipe 45a to the fuel cell stack 14. The remaining exhaust fuel gas is discharged to the outside when the purge valve 56 is opened.

Further, as shown in FIG. 5, the coolant flows from the coolant supply passage 74a to the coolant flow field 86 between the first and second metal separators 68, 70. Then, the coolant flows along the coolant flow field 86, in the direction indicated by the arrow B. After the coolant has been used for cooling the membrane electrode assembly 66, the coolant flows into the coolant discharge passage 74b. The coolant is discharged from the coolant outlet manifold 96b at the end plate 62a into the coolant discharge pipe 30. As shown in FIGS. 3 and 4, after the coolant has been cooled by the radiator 24, the coolant is supplied from the coolant supply pipe 28 to the fuel cell stack 14 through operation of the coolant pump 26.

In the present embodiment, as shown in FIG. 2, the fuel cell stack 14 is mounted in the center console 22 of the vehicle 12. The coolant supply mechanism 16 is provided on the front side, in the traveling direction indicated by the arrow L1, relative to the fuel cell stack 14, and the fuel gas supply mechanism 20 is provided on the rear side, in the traveling direction indicated by the arrow L2, relative to the fuel cell stack 14.

The coolant supply mechanism 16 includes the coolant supply pipe 28 and the coolant discharge pipe 30, which are disposed on the front side in the traveling direction, relative to the fuel cell stack 14. Thus, the coolant supply pipe 28 and the coolant discharge pipe 30, which connect the radiator 24 and the fuel cell stack 14, have simple shapes, and the pipe length thereof can be advantageously reduced. Accordingly, pressure losses in the coolant supply pipe 28 and the coolant discharge pipe 30 can be effectively reduced, while also decreasing the overall weight of the pipes.

Further, the fuel gas supply mechanism 20 includes a fuel gas supply pipe 45 disposed on the rear side in the traveling direction, relative to the fuel cell stack 14. Therefore, the length of the fuel gas supply pipe 45 extending from the fuel gas tank 44 to the fuel cell stack 14 is effectively reduced, and the fuel gas is supplied more efficiently.

Further, the power generation cells 60, each of which has an elongated shape, are stacked in the longitudinal direction of the vehicle 12, as indicated by the arrow L. In the humidifier 36 that is fixed to the fuel cell stack 14, the hollow fiber membranes 122a, 122b extend in the longitudinal direction of the vehicle 12. The dimensions of the fuel cell stack 14 and the humidifier 36 are small in the lateral direction of the vehicle 12 indicated by the arrow W, whereas the dimensions of the fuel cell stack 14 and the humidifier 36 in the longitudinal direction of the vehicle 12 are large. With such a structure, in particular, the layout of the center console 22 of the vehicle 12 can suitably and easily be determined. Since the fuel cell stack 14 is provided at a center position in the lateral direction of the vehicle 12, the left weight and the right weight of the vehicle 12 can be uniformly balanced.

Further, as shown in FIGS. 6 and 7, in the present embodiment the humidifier 36 is integrally mounted on the end plate 62b of the fuel cell stack 14, and further, the humidifier 36 functions as a mount for fixing the fuel cell stack 14 to the installation section 102.

Specifically, the casing 104 of the humidifier 36 includes the flange section 106, which serves as a coupling section fixed to the end plate 62b of the fuel cell stack 14 through the bolts 108. The casing 104 also includes the mount sections 110a, 110b, which are fixed to the installation section 102 of the vehicle 12 by the bolts 112, while supporting one end of the fuel cell stack 14 in the stacking direction (on the side of the end plate 62b).

In the above structure, the mount sections 110a, 110b provide mounting functions, for fixing the humidifier 36 to the installation section 102, and for fixing the one end of the fuel cell stack 14 to the installation section 102 in the stacking direction. Therefore, dedicated mounting structures are not required for the end plate 62b of the fuel cell stack 14. Since the components serve multiple functions, the number of components is advantageously reduced, and the overall weight of the fuel cell system 10 is easily reduced.

The humidifiers 36 and the fuel cell stack 14 are combined together by directly fixing the fuel cell stack 14 to the humidifier 36 using screws. Thus, no pipes are required between the fuel cell stack 14 and the humidifier 36. Accordingly, water condensation in the pipes, due to cooling of the air and the fuel gas (reactant gases) supplied to the fuel cell stack 14, can be suitably prevented. Further, the number of components is reduced, and a reduction in weight is easily achieved.

Further, in the present embodiment, as shown in FIG. 6, reactant gas auxiliary devices, such as the shut-off valve 46, the regulator 48, and the ejector 50, are directly fixed to the casing 104 of the humidifier 36 using the bolts 130, 132, 134.

In the humidifier 36, air compressed by the air pump 32 is supplied from the air supply pipe 34 to the first and second humidification sections 116a, 116b. Since significantly hot air is supplied into the humidifier 36 by compression, the high temperature of the casing 104 of the humidifier 36 is maintained. Thus, the temperature of the shut-off valve 46, the regulator 48, and the ejector 50, which are directly mounted on the casing 104, is reliably maintained. Further, the temperatures of the humidifier 36 and the casing 104, which serves as a metallic cover member for supporting the humidifier 36, are maintained as a result of the off gas from the fuel cell stack 14 (i.e., the gas supplied from the off gas supply pipe 40 and the branch pipes 40a, 40b).

In this structure, dedicated mechanisms are not required for maintaining the heat of the reactant gas auxiliary devices, such as the shut-off valve 46, the regulator 48, and the ejector 50. Accordingly, by a simple and economical structure, the temperatures of the reactant gas auxiliary devices can be suitably maintained.

In particular, even if the vehicle 12 is used in cold regions, freezing of the reactant gas auxiliary devices can be reliably prevented. Thus, a suitable and efficient power generation function of the fuel cell system 10 is reliably achieved.

Further, in the present embodiment, the air channel pipe 114, the branch pipes 40a, 40b, the humidified air supply pipe 38, the exhaust fuel gas pipe 52, and the return pipe 54, are provided integrally inside the casing 104. Various reactant gas pipes outside of the casing 104 are not required. With this structure, the number of components is reduced significantly, and advantageously, the piping structure is simplified.

Further, since the high temperature inside the casing 104 can be maintained, in particular, in the exhaust fuel gas pipe 52 and the return pipe 54, the circulating exhaust fuel gas is not cooled excessively. Thus, it is possible to reliably prevent condensation of water in the exhaust fuel gas.

While the invention has been particularly shown and described with reference to a preferred embodiment, it will be understood that variations and modifications can be effected thereto by persons skilled in the art without departing from the spirit and scope of the invention as defined by the appended claims.

What is claimed is:

1. An in-vehicle fuel cell system comprising:
   a fuel cell stack formed by stacking a plurality of power generation cells, said fuel cell stack being mounted in a vehicle;
   a humidifier for humidifying at least one reactant gas by a humidified fluid, the humidifier comprising a casing, wherein: said casing is provided immediately adjacent to the humidifier but does not substantially surround the fuel cell stack and includes a coupling section that is integrally mounted to an end of said fuel cell stack in a stacking direction, said vehicle comprises a mount section and the humidifier integrally includes a mount section fixed to the mount section of said vehicle while supporting said end of said fuel cell stack in the stacking direction, and the humidifier is provided at one end of the fuel cell stack in the stacking direction so that a flow direction of humidified air that exits the humidifier is substantially into the end of the fuel cell stack; and
   a humidified air pipe for supplying humidified air to the fuel cell stack is provided inside the casing of the humidifier.

2. An in-vehicle fuel cell system according to claim 1, wherein said humidifier comprises a hollow fiber type humidifier; and
   said hollow fiber type humidifier includes a hollow fiber extending in a longitudinal direction of said vehicle.

3. An in-vehicle fuel cell system according to claim 1, wherein at least one reactant gas directly flows through said fuel cell stack.

4. An in-vehicle fuel cell system according to claim 1, wherein the casing of the humidifier includes a metal cover member, and wherein a reactant gas auxiliary device is directly attached to said metal cover member.

5. An in-vehicle fuel cell system according to claim 1, wherein a reactant gas pipe through which at least one reactant gas flows is provided in said metal cover member.

6. An in-vehicle fuel cell system according to claim 1, wherein said humidifier comprises a hollow fiber type humidifier coupled at one end of said fuel cell stack in a stacking direction.

* * * * *

UNITED STATES PATENT AND TRADEMARK OFFICE
CERTIFICATE OF CORRECTION

PATENT NO.        : 8,415,060 B2
APPLICATION NO.   : 11/524779
DATED             : April 9, 2013
INVENTOR(S)       : Kazunori Fukuma et al.

It is certified that error appears in the above-identified patent and that said Letters Patent is hereby corrected as shown below:

In the Claims:

Column 12, line 26, delete "claim 1" and insert --claim 4--.

Column 12, line 29, delete "claim 1" and insert --claim 4--.

Signed and Sealed this
Tenth Day of September, 2013

Teresa Stanek Rea
*Acting Director of the United States Patent and Trademark Office*